United States Patent [19]

Bond, Jr.

[11] Patent Number: 4,734,682

[45] Date of Patent: Mar. 29, 1988

[54] LOW FLUID LEVEL WARNING SYSTEM

[76] Inventor: Charles R. Bond, Jr., 2241 Boston, S.E., Grand Rapids, Mich. 49506

[21] Appl. No.: 879,275

[22] Filed: Jun. 27, 1986

[51] Int. Cl.⁴ .......................... G08B 21/00; B60Q 1/00
[52] U.S. Cl. ...................................... 340/614; 340/59
[58] Field of Search .................. 340/59, 60, 52 F, 612, 340/614, 618; 116/227; 73/299, 302, 303

[56] References Cited

U.S. PATENT DOCUMENTS

| | | | |
|---|---|---|---|
| 2,588,761 | 3/1952 | Raby | 340/59 |
| 2,671,893 | 3/1954 | Van Scoy et al. | 340/60 |
| 2,800,648 | 7/1957 | Kelly | 340/614 |
| 3,132,331 | 5/1964 | Boddy | 340/59 |
| 3,196,389 | 7/1965 | Heidner | 340/60 |
| 3,333,259 | 7/1967 | Carothers, Jr. | 340/59 |

Primary Examiner—James L. Rowland
Assistant Examiner—Brian R. Tumm
Attorney, Agent, or Firm—Varnum, Riddering, Schmidt & Howlett

[57] ABSTRACT

A low fluid level warning system (100) is adapted for use with a conventional oil circulation and low pressure warning system in an engine-driven vehicle. Oil from a crankcase reservoir (102) is pumped through an inlet conduit (110) to varius engine supply lines (116). A portion of the oil is also pumped into an enclosed chamber (124). A pressure sensor diaphragm (132) and switch contacts (130) sense the chamber pressure and illuminate a warning lamp (142) when the pressure is below a predetermined pressure. A drain conduit (160) extends from the bottom of the chamber at the bottom of the oil reservoir (102). A vent conduit (150) extends from the top of the chamber to a predetermined level in the reservoir (102). If the oil in the reservoir (102) is below the predetermined level, the chamber (124) drains completely when the engine is turned off. If the oil in the reservoir (102) is above the predetermined level, the chamber oil does not drain. When the engine is next started, the duration of time (short or extended) necessary for the chamber pressure to build up, and extinguish the warning lamp, is indicative of whether the oil in the reservoir is above or below the predetermined level.

12 Claims, 3 Drawing Figures

LOW FLUID LEVEL WARNING SYSTEM

TECHNICAL FIELD

The invention relates to low fluid level warning systems and, more particularly, to oil circulation systems using pressure concepts for providing indication as to whether the crankcase oil level is below a predetermined level.

BACKGROUND ART

In automobiles and other types of engine-driven vehicles requiring the use of lubricating fluid such as oil, indicator systems for warning the operator of low oil pressure have long been standard vehicle equipment. These indicator systems provide the operator with a warning that system oil pressure has been lost or is abnormally low. Such warnings are frequently indicative of an inoperable oil pump, a substantial leak or, most often, neglected oil additions in a worn engine.

Such systems have used various techniques for visually indicating low oil pressure to the vehicle operator. For example, many present-day engine lubrication systems include an oil pump which circulates oil from a crankcase reservoir through various supply lines to continuously lubricate engine components. The oil is pumped from the reservoir through a conduit having an open end near the bottom of the crankcase. Included in the system on the transmitting side of the pump is a pressure sensitive device which is electrically connected to a visual indicating means such as a warning light on the vehicle dashboard. The pressure sensitive device can be, for example, a conventional diaphragm assembly which spatially operates a relay or other type of contact switch for selectively illuminating the warning light. If the oil level in the crankcase is too low, and little or no oil is pumped toward the diaphragm, the warning light continues to remain illuminated after the engine is started by the operator.

Unfortunately, the type of conventional warning system described above does not provide any prior warning of loss of oil pressure. That is, the oil pressure loss warning may occur too late to prevent engine damage, or it may occur when the vehicle is far from a place where the defect or malfunction causing the oil pressure loss can be timely and conveniently repaired. Furthermore, such oil pressure loss can also occur merely from neglected servicing of the vehicle by the operator. Again, the warning provided by the aforedescribed system will not occur until a high probability of serious damages exists. With the continuing increase in time periods between servicing of modern engine components such as spark plugs, ignitions, etc., the probability of neglecting periodic oil servicing has also increased. Accordingly, warning systems which include indication only of oil pressure loss are becoming increasingly unacceptable.

Several prior art vehicle warning systems have been developed to provide vehicle operators with indications of actual reservoir oil levels or of low oil levels prior to complete loss of pressure. For example, the Carothers, Jr. U.S. Pat. No. 3,333,259, issued July 25, 1967, discloses an oil level indicator including a conduit disposed in an oil pan which either draws oil or air up through the conduit, depending upon the level of oil in the pan. A vacuum, which is created through a piston-type switch, draws the oil or air into the line which is then communicated to a diaphragm actuator for an indicator light. When the oil level is low, air is drawn through the line due to the vacuum. The air pressure is not sufficient to move the diaphragm, which thus remains in a normally closed position and actuates a warning light.

The Kelly U.S. Pat. No. 2,800,648, issued July 23, 1957, describes an oil level indicator including two tubes which terminate at different heights in the crankcase. The tubes communicate to a casing or head including venturis which create a vacuum or suction for drawing either air or oil into the tubes, dependent upon the level of the tube with respect to oil in the crankcase. A diaphragm valve responds to the pressure differential in the tubes so as to activate a warning light.

In the Raby U.S. Pat. No. 2,588,761, issued Mar. 11, 1952, an oil level indicator includes a tube disposed in an oil pan which is communicative with a diaphragm-operated switch. The operator indicator is operated by communicating the vacuum from the engine to the level-indicating device which draws oil into a chamber in which a float is disposed. As the level in the chamber rises, the float closes a valve which in turn causes movement of the diaphragm to complete an indicating circuit.

Though the aforedescribed patents disclose systems adapted to indicate a low oil level to an operator prior to complete oil pressure loss, the systems either must be completely substituted for industry-standard oil pressure warning systems, or they include a substantial number of components additional to those of industry-standard warning systems. Accordingly, such systems are difficult and expensive, if not impossible, to retrofit into existing vehicles. Furthermore, the systems are more expensive and complex than standard oil pressure warning systems, even if they are only fitted to new vehicles. For example, certain of these prior art systems require visual indicator devices in addition to an oil pressure warning light. Such systems would therefore also require redesign of the vehicle's dashboard instrument arrangement.

DISCLOSURE OF INVENTION

In accordance with the invention, a low fluid level warning system having indicator means for providing indications of system pressure also utilizes the indicator means to provide a warning when the level of fluid in a reservoir is below a predetermined level at each time the engine is started. The warning system includes first conduit means for receiving fluid from the reservoir, selectively activated circulating means for pumping fluid from the reservoir and pressure sensing means for sensing the pressure in the conduit means. The indicator means includes activated and deactivated states and the warning system includes means for delaying deactivation of the indicator means when the pressure in the first conduit means first rises above a predetermined pressure downstream of the circulating means and the level of fluid in the reservoir is below the predetermined level.

The first conduit means includes an opening positioned near the bottom inner surface of the reservoir at a first level and below the predetermined level. The circulating means is connected to the first conduit means, includes activated and deactivated states and pumps fluid from the reservoir when in the activated state. The pressure sensing means comprises an enclosed chamber connected to the first conduit means at a lower portion thereof and is adapted to receive a portion of the fluid pumped through the first conduit means. Deactivation of the indicator means is delayed by utilization of a vent conduit means having one end connected to the enclosed chamber and terminating at the upper portion therewithin. The other end is positioned in the reservoir at the predetermined level. A drain conduit means has one end connected to the enclosed chamber terminating at a bottom portion thereof and the other end positioned at a bottom portion of the reservoir. The vent conduit means and the drain conduit means are adapted to drain fluid from the enclosed chamber upon deactivation of the circulating means when the reservoir fluid level is below the predetermined level, and to prevent drainage of fluid from the chamber when the fluid is above the predetermined level.

Further in accordance with the invention, the vent conduit means and the drain conduit means have means to prevent air from entering the enclosed chamber upon deactivation of the circulating means when the level of fluid in the reservoir is above the predetermined level, thereby prohibiting drainage of fluid from the enclosed chamber. Additionally, the pressure sensing means comprises switch means having first and second switching states and connected to the enclosed chamber for sensing the pressure therein, whereby the switch means is in the first switching state when the chamber pressure is below a predetermined chamber pressure and the circulating means is in the activated state. The indicator means is connected to the switch means and is adapted to be in the activated state when the switch means is in the first switching state.

The warning system further comprises an inlet resistance means connected between the first conduit means and the enclosed chamber for restricting flow of fluid to the chamber. This first conduit means also has a vertically disposed U-shaped portion, extending down into the reservoir, between the circulation means and the enclosed chamber which U-shaped portion serves to prevent air from entering the enclosed chamber when the engine is not running and the fluid within the chamber tends to drain to the reservoir through the drain conduit. Additionally, resistance means are connected in each of the vent conduit means and the drain conduit means leading from the enclosed chamber to the engine reservoir. The inlet conduit resistance means is chosen to control the fill time of the enclosed chamber after the engine is started when the chamber is initially empty. The conduit resistance means in each of the vent conduit means and the drain conduit means are chosen to provide the steady state pressure in the enclosed chamber while the engine is running at a substantial fraction of the pressure in the inlet conduit.

In one embodiment of the invention, the pressure sensing means comprises a diaphragm-operated switch having contacts operable by differential spatial pressures on an associated diaphragm. Additionally, the circulating means comprises an oil circulation pump and the indicator means comprises a vehicle dashboard warning light electrically connected to the pressure sensing means and arranged so that pressure less than the predetermined steady state, engine running pressure in the enclosed chamber causes the warning light to be illuminated.

DRAWINGS

The invention will now be described with reference to the drawings in which.

DETAILED DESCRIPTION

Figure 1:
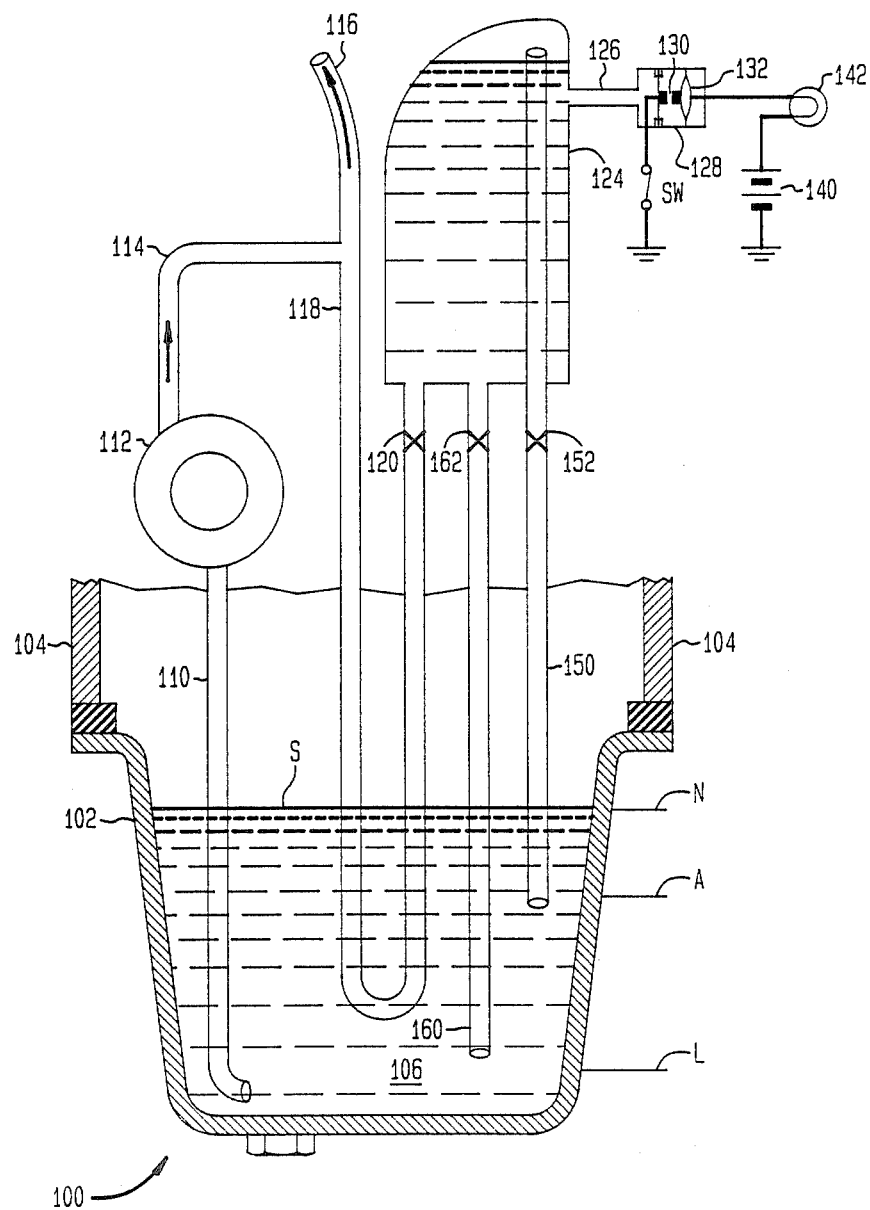
FIG. 1 is a schematic diagram of a fluid level warning system in accordance with the invention, shown in the steady state engine running condition.

The principles of this invention are disclosed, by way of example, in a fluid level warning system 100 as depicted in FIG. 1. For purposes of description, the warning system 100 is disclosed herein as adapted for use with a conventional oil circulation and pressure warning arrangement in an engine-driven vehicle. However, a warning system in accordance with the invention can be utilized with other types of fluid circulation and warning arrangements which comprise a fluid reservoir and make use of pressurization principles.

The warning system 100 is connected to the lower portion of a standard vehicle cylinder block 104. The engine (not shown in its entirety) includes an oil crankcase or reservoir 102. The reservoir 102 is adapted to hold lubricating oil 106 having a reservoir surface level S as depicted in FIG. 1. The "normal" oil level of reservoir 102 is depicted in FIG. 1 as level N. The level at which the vehicle operator should add oil to the crankcase is correspondingly depicted as level A.

Extending below the surface of oil 106 to the bottom portion of the reservoir 102 is a hollow inlet conduit 110 as depicted in FIG. 1. One end of the hollow inlet conduit 110 is positioned at a level L within the reservoir 102. Inlet conduit 110 is connected through a conventional oil pump 112 which is utilized to pump the oil 106 upwardly through conduit 110 and through a following "transmitting" conduit 114 to supply line 116. The supply line 116 circulates oil to various engine components (not shown) in a conventional manner, after which the oil drains through cylinder block 104 and returns to reservoir 102. The pump 112 and supply lines 116 thus correspond to an oil circulation means for circulating oil 106 between reservoir 102 and the engine components.

A portion of the oil pumped through the transmitting conduit 114 flows through a warning system inlet conduit 118 as depicted in FIG. 1. Inlet conduit 118 has a U-shape, the bight portion of which is located near the bottom level of the reservoir. An inlet flow restrictor 120 is provided in conduit 118 to limit the flow rate of oil over therethrough. A downstream end of conduit 118 is connected to the lower portion of an enclosed warning system pressure chamber 124. Connected to an opening at the side of chamber 124 is a short outlet conduit 126 directly connected to a pressure sensor 128. The pressure sensor 128 can be, for example, a diaphragm-operated switch having contacts 130 operable by differential spatial pressures on diaphragm 132.

An electrical system for the contacts 130 includes an ignition switch symbolically depicted in FIG. 1 as switch SW, a conventional vehicle battery 140, oil warning light 142 and conventional grounds. Battery 140 is connected to the contacts 130 which, in turn, are connected through electrical wiring to a conventional and industry-standard oil pressure warning light 142 commonly mounted on a vehicle dashboard. When a pressure of less than a predetermined pressure is exerted on diaphragm 132 from oil in chamber 124, the contacts 130 remain in a "closed" state whereby a closed electrical path is maintained between battery 140 and light 142. Correspondingly, with one terminal of warning light 142 also connected to battery 140, a closed-loop circuit path is established with battery 140 when switch SW is closed, thereby causing light 142 to be illuminated. Conversely, when the pressure in chamber 124 is greater than the predetermined pressure, the change in spatial position of diaphragm 132 causes contacts 130 to transfer to an "open" state whereby an open electrical path exists between battery 140 and warning light 142. Accordingly, under high oil pressure conditions, the light 142 will not be illuminated regardless of the state of ignition switch SW. The warning light 142 can be a conventional oil pressure warning lamp mounted on the vehicle dashboard instrument arrangement.

The structure of warning system 100 heretofore described comprises a conventional and industry-standard oil pressure warning system commonly utilized in automobiles and similar vehicles. When the engine is operating, the pump 112 is active and switch SW is closed. Oil is therefore pumped from reservoir 102 through inlet conduit 110 and circulated through supply lines 116 to the various engine components. As previously described, a portion of the oil also flows through conduit 118, inlet flow restrictor 120 and into the pressure chamber 124. If sufficient oil is in the reservoir 102, and the pump 112 and other components of the circulation system are operating properly, the pressure of oil in chamber 124 will cause diaphragm 132 to move to a position whereby contacts 130 are maintained in an "open" state and an open electrical path therefore exists between battery 140 and light 142, so that light 142 remains in an "off" state.

If oil pressure in the circulation arrangement is low (or nonexistent) due to malfunction of pump 112, lack of oil in reservoir 102, a supply line or conduit leak, or any of a number of other reasons, the pressure of oil in chamber 124 will be insufficient to operate the pressure sensor 128. Accordingly, the contacts 130 remain closed and the warning light 142 will be illuminated so long as ignition switch SW is closed.

It should be noted that the vertical position of the open terminating end of inlet conduit 110 within reservoir 102 will determine the level of oil in the reservoir at or below which the pressure in the circulation arrangement will decrease, since less oil will be pumped upward through conduit 110 if the reservoir oil level is below the upper edge of the conduit end. Further, the diaphragm 132 and contacts 130 can be calibrated so that contacts 130 will operate to illuminate light 142 when the pressure of oil in chamber 124 corresponds to an oil pressure in supply lines 116 below which engine components will not receive sufficient lubrication to operate effectively and without damage. This arrangement provides the normal industry standard low oil pressure warning activation of the dashboard oil warning light.

In accordance with the invention, the warning system 100 includes a vent conduit 150 and a drain conduit 160. The vent conduit 150 terminates at its lower portion in a downwardly directed opening positioned at level A in reservoir 102, corresponding to the oil surface level below which the vehicle operator should add oil, for example, one quart low. The vent conduit 150 extends upwardly from its opening in reservoir 102 and through the lower portion of pressure chamber 124, terminating in an opening located within the upper interior of chamber 124. Conduit 150 has a restrictor 152 which provides bidirectional resistance to conduit fluid flow therethrough. The drain conduit 160 terminates at its lower portion in an opening at level L in the reservoir and extends to the enclosed pressure chamber 124 terminating in the lower floor of such chamber. The drain conduit 160 includes a restriction 162 which provides bidirectional resistance to conduit fluid flow therethrough.

The operation of the warning system 100 in accordance with the invention will now be described with respect to FIGS. 2 and 3. When the vehicle has been operating for a greater time duration than approximately fifteen seconds, the oil circulation and pressure warning arrangement will operate as previously described herein. That is, the utilization of conduits 150 and 160 in accordance with the invention does not alter the capability of providing a visual indication to the operator of low oil pressure during steady-state engine operation. During this normal engine operation a small portion of the oil flowing through the oil pump 112 is passed into the enclosed pressure chamber 124 through the inlet conduit 118 and out of the chamber back to the reservoir through the conduits 150 and 160. The pressure within the enclosed pressure chamber 124 during this normal operation will be some fraction of the oil pump pressure determined by the three enclosed pressure chamber conduit restrictors 120, 152 and 162 according to well-known principles of fluid mechanics.

Additionally, however, if the level of oil in reservoir 102 is above level A, the vent conduit 150 will be substantially full of oil, assuming that oil pressure in the circulation arrangement and chamber 124 is sufficient.

When the vehicle is shut off, the pump 112 will cease to operate and switch SW will open. Due solely to gravitational effects, the oil in pressure sensing chamber 124 will then tend to drain into reservoir 102 through restrictor 162 and drain conduit 160. The oil in vent conduit 150 will also tend to drain into reservoir 102. However, if the reservoir oil level is above level A as depicted in FIG. 2, the vertical height of the oil columns in the conduits 150 and 160 extending from the bottom of the enclosed chamber to the oil surface in the reservoir will be exactly the same. Therefore, neither oil column will predominate and the only action will be a very small amount of drainage of both oil columns into the reservoir until the small air bubble in the top of the enclosed chamber is enlarged to provide a small negative pressure with respect to the existing atmospheric pressure to balance the pressure heads of the oil columns in the two return conduits. At this time an equilibrium is established and no further drainage takes place, thereby keeping the enclosed chamber essentially full of oil.

Figure 2:
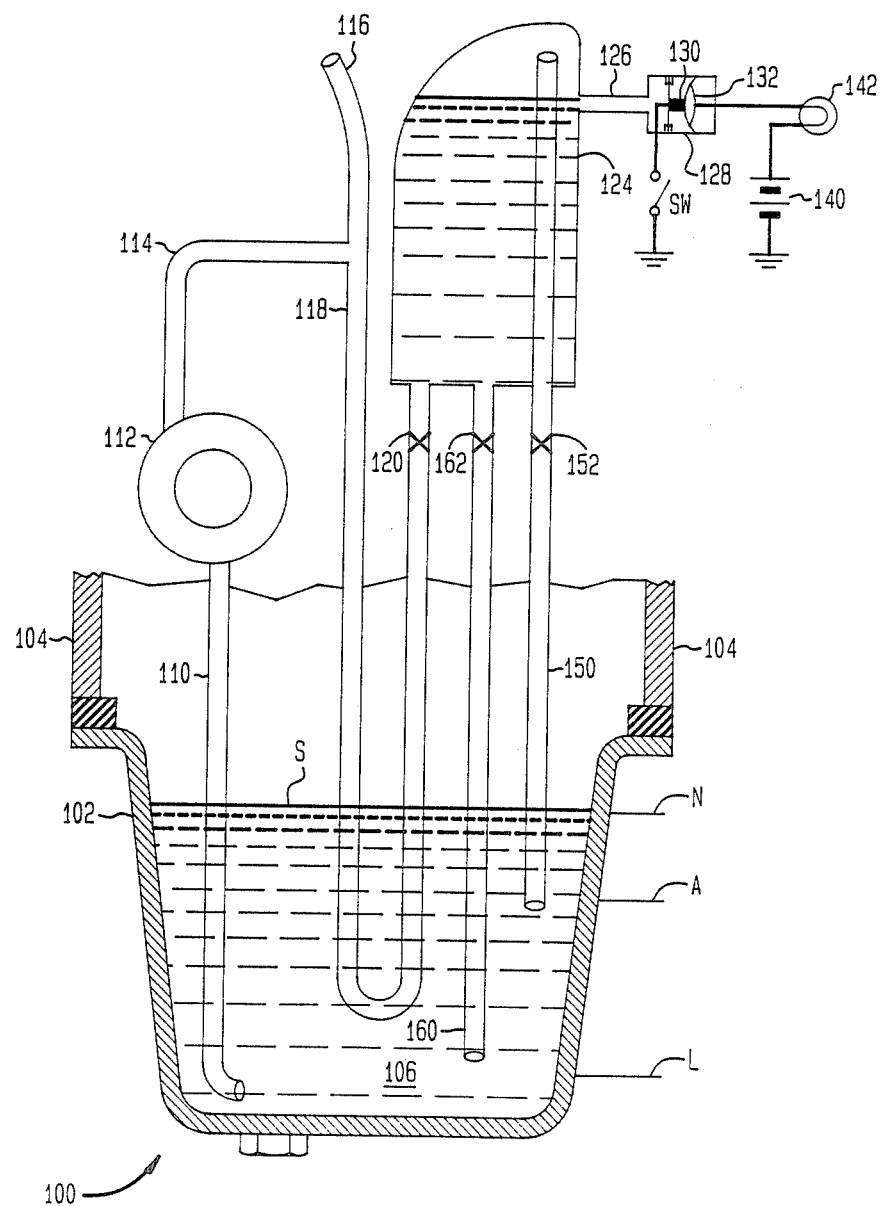
FIG. 2 is a schematic diagram of the fluid level warning system steady state condition following shut-off of the associated vehicle with the fluid reservoir level above a predetermined level.

Then, the fluidic state of chamber 124 will be as depicted in FIG. 2 when the engine is next started and pump 112 is activated. Immediately following closure of ignition switch SW, the pressure sensor 128 will be in a state whereby contacts 130 are closed and a closed electrical path therefore exists between battery 140 and warning light 142. The warning light 142 will therefore be illuminated. However, assuming that all components of the oil circulation arrangement are working properly when the engine is started, the action of pump 112 will almost immediately pump sufficient oil into chamber 124 necessary to operate diaphragm 132 and contacts 130, thereby opening the electrical path between battery 140 and light 142. This immediate build-up of sufficient pressure in chamber 124 is caused by the fact that chamber 124 will be substantially full of oil prior to closure of ignition switch SW and activation of pump 112. Accordingly, only a small volume of oil needs to be pumped into chamber 124 to reach the steady state oil flow rate through the chamber 124 and the corresponding steady state engine running pressure in the chamber to operate pressure sensor 128.

Figure 3:
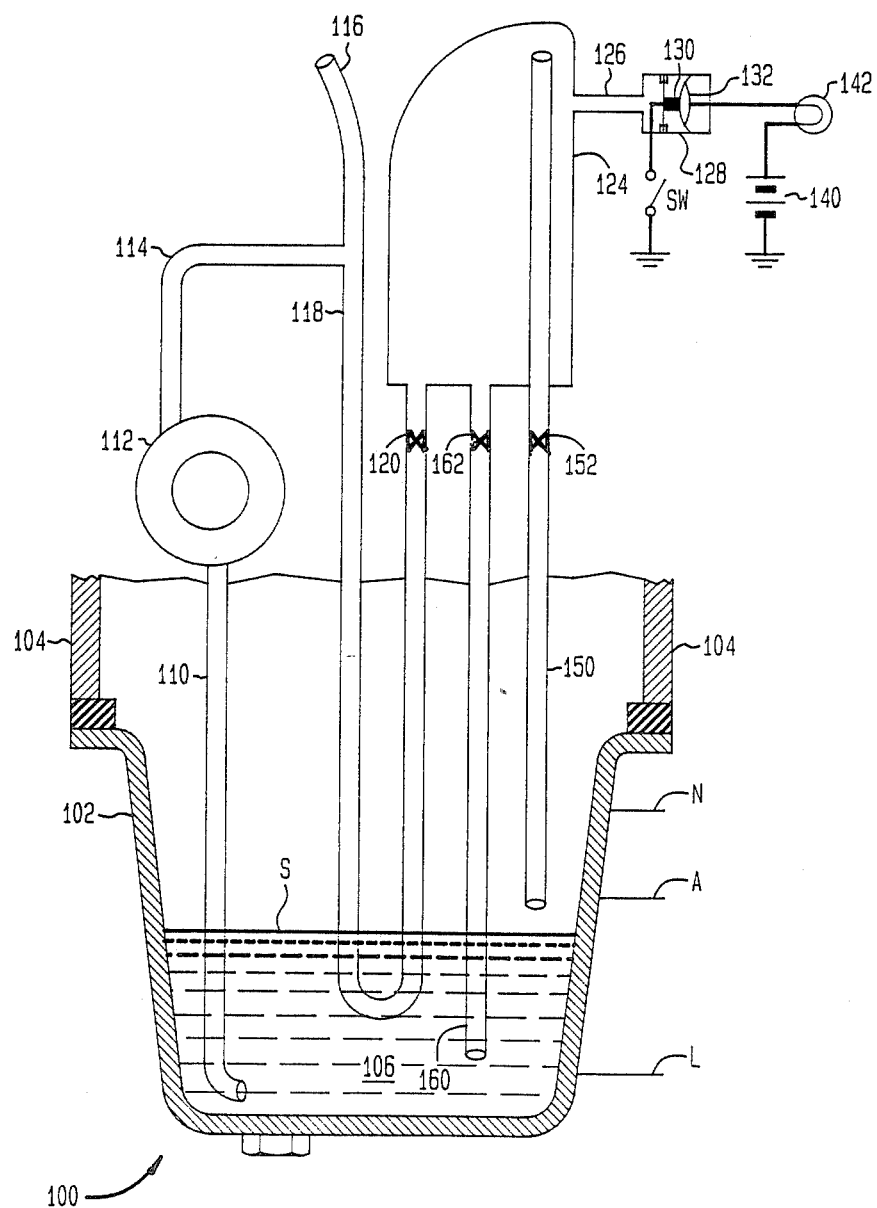
FIG. 3 is a diagram of the fluid level warning system steady state condition following shut-off of the associated vehicle with the fluid reservoir level below the predetermined level.

FIG. 3 depicts the steady state of warning system 100 following shut-off of the engine when the reservoir oil level is below level A. As previously described with respect to FIG. 2, some oil in chamber 124 will drain into reservoir 102 through conduits 150 and 160. In this state, however, the height of the oil columns in the two return conduits will not be equal since the column in drain conduit 160 will be greater than that in vent conduit 150 by the distance that the terminating end of conduit 150 is above the surface of the oil in reservoir 102. The oil column in drain conduit 160 will drain a small amount until the air pressure in the air bubble at the top of the enclosed chamber is reduced sufficiently so that atmospheric pressure will support the column. This reduction in air pressure from atmospheric pressure will be greater than the pressure head of the oil column in return conduit 150 and the oil column therein will be forced up the conduit by atmospheric pressure. The oil column in vent conduit 150 as it moves up the vent conduit 150 will spill over the top end into the chamber as air enters at the bottom of the conduit above the oil surface in the reservoir. Once this action starts it will increase the differential of the pressure heads of the oil columns in the two conduits 150 and 160, and the upward flow of the oil column in conduit 150 will accelerate until it is emptied of oil. At this time air will pass into the enclosed chamber 124 easily through conduit 150 and restrictor 152 and raise the air pressure in the top of the chamber 124 to nearly atmospheric pressure which will further accelerate the drainage of the oil in the chamber through conduit 160 and restrictor 162 until the chamber is essentially empty.

When the engine is next started, and pump 112 is activated and ignition switch SW is closed, there will be no oil in chamber 124 and the chamber will be air-filled at atmospheric pressure only. The warning light 142 is therefore initially illuminated. As pump 112 causes oil to be pumped toward chamber 124, the air therein must first be forced out through exit restrictor 152 in conduit 150. While the air is being forced out and chamber 124 is filling with oil, little or no pressure will be exerted on diaphragm 132 because the restrictor 152 in return conduit 150 will cause a much lower pressure drop from the air flow through it as compared to an oil flow because of air's low density and viscosity. Thus, during the time that the air is being forced out of the chamber through conduit 150, the chamber pressure remains low and only slightly above atmospheric pressure. During this extended period of time, the warning light 142 remains illuminated. Only when the chamber 124 is filled with oil and oil starts to flow through return conduit 150 and restrictor 152 will there be a much greater pressure drop across restrictor 152 caused by the much greater density and viscosity of the oil. This pressure drop across restrictor 152 will raise the pressure in the chamber 124 sufficiently to extinguish the warning light 142, due to the opening of the electrical path between battery 140 and light 142. This action completes the transition to the normal engine running steady-state condition.

As evident from the foregoing description, the vehicle operator can readily determine, following each starting of the engine, whether the level of oil in reservoir 102 is below level A by detecting the duration of time that warning light 142 remains illuminated after the engine is started. If the oil is at or above level A, the substantial volume of oil in chamber 124 when the vehicle is started will lead to a fast build-up of pressure in chamber 124 and a short period of time before light 142 is extinguished. This period of time can be in the range of one to three seconds which is barely more than the delay of oil pressure sensor switches in reacting to the build-up of oil pressure in current engines. Conversely, if the reservoir oil is below level A, a substantially greater period of time is required for pressure build-up in chamber 124, operation of pressure sensor 128 and corresponding extinguishment of warning light 142. With a conventional automotive oil pressure warning system utilized with the invention, this period of time can be in the range of ten to fifteen seconds. With the substantial difference between the aforedescribed time periods, the vehicle operator can readily and visually detect a condition whereby oil should be added to reservoir 102.

As also apparent from the foregoing description, an oil level warning system in accordance with the invention requires no modifications of components of industry-standard and conventional oil pressure warning systems, other than the addition of an enclosed pressure chamber and the return conduits 150 and 160 and elements associated therewith, none of which make use of any moving parts. Furthermore, the warning system 100 comprises no complex mechanical assemblies additional to that of a conventional oil pressure warning system, nor does it require additional electrical circuitry. Still further, the warning light 142 can merely be a conventional dashboard instrument serving the dual purpose of warning of low oil pressure and low reservoir oil level. Accordingly, a warning system in accordance with the invention requires no modification of design of a conventional dashboard instrument arrangement. Additionally, the warning given to the vehicle operator of a low oil level occurs only when the engine is started. Accordingly, there is no additional information display to the vehicle operator that has to be monitored during the remaining time that the engine and vehicle is in operation for the low oil level warning.

The principles of the invention are not limited to the specific oil level warning system described herein. For example, a warning system in accordance with the invention could be implemented with any fluid circulation system utilizing concepts similar to those of conventional engine lubrication circulation systems. It will also be apparent to those skilled in the art that other modifications and variations of the above-described illustrative embodiment of the invention may be effected without departing from the spirit and scope of the novel concepts of the invention.

The embodiments of the invention in which an exclusive property or privelege is claimed are defined as follows:

1. A low fluid level warning system for use with a reservoir to provide a warning when the level of fluid in the reservoir is below a predetermined level, the warning system comprising:

first conduit means having an opening positioned near the bottom inner surface of the reservoir at a first level thereof and below said predetermined level for receiving fluid therefrom;

selectively activated circulating means having activated and deactivated states, and connected to the first conduit means for pumping fluid from the reservoir upwardly through the first conduit means when in the activated state;

pressure chamber means connected to said circulating means to receive pressurized fluid from said circulating means;

pressure-sensing means connected to the pressure chamber means for sensing the pressure therein; and indicator means having activated and deactivated states and connected to the pressure-sensing means for providing an indication of the pressure in the pressure chamber means, whereby the indicator means is in the deactivated state when the pressure in the pressure chamber means is above a predetermined pressure and the indicator means is in the activated state when the pressure in the pressure chamber means is below the predetermined pressure;

said indicator means being deactivated substantially immediately upon selectively activating the circulating means following a state of deactivating the circulating means when the level of fluid in the reservoir is above the predetermined level;

the improvement which comprises:

the warning system further comprises means for delaying deactivation of the indicator means for a relatively short defined period of time only when the level of fluid in the reservoir is above the first level and below the predetermined level, whereupon after said defined period of time, said indicator means will be deactivated.

2. A low fluid level warning system in accordance with claim 1 wherein the means for delaying deactivation of the indicator means comprises a vent conduit means having one end terminating at an upper portion of the pressure chamber means and another end positioned in the reservoir at the predetermined level, the vent conduit means being adapted to vent air into the enclosed chamber upon deactivation of the circulating means and only when the level of fluid in the reservoir is below the predetermined level.

3. A low fluid level warning system in accordance with claim 2 wherein the means for delaying the deactivation of the indicator means further comprises a drain conduit to drain fluid from the pressure chamber means upon deactivation of the circulating means when the level of fluid in the reservoir is below the predetermined level.

4. A low fluid level warning system in accordance with claim 3 and further comprising a U-shaped conduit between said pressure chamber means and said circulating means to transmit fluid therebetween, at least a bottom portion of said U-shaped conduit positioned below said predetermined level of said reservoir and a top portion of said U-shaped conduit being above said predetermined level of said reservoir so that a quantity of said fluid remains in said U-shaped conduit to prevent air from passing through said U-shaped conduit from said pressure chamber when said circulating means is deactivated.

5. A low fluid level warning system in accordance with claim 4 wherein the pressure-sensing means further comprises switch means having first and second switching states and connected to the enclosed chamber for sensing the pressure therein, whereby the switch means is in the first switching state when the chamber pressure is below the predetermined chamber pressure and the circulating means is in the activated state; and the indicator means is connected to the switch means and is adapted to be in the activated state when the switch means is in the first switching state.

6. A low fluid level warning system in accordance with claim 4 wherein the means for delaying deactivation of the indicator means further comprises an inlet flow restrictor means in the U-shaped conduit for restricting the flow of fluid to the chamber.

7. A low fluid level warning system in accordance with claim 4 wherein the vent conduit means has a flow restrictor means to restrict the flow of fluid therethrough.

8. A low fluid level warning system in accordance with claim 1 wherein the pressure-sensing means comprises a diaphragm-operated switch having contacts operable by differential pressures on a diaphragm.

9. A low fluid level warning system in accordance with claim 1 wherein the circulating means comprises an oil circulation pump.

10. A low fluid level warning system in accordance with claim 1 wherein the indicator means comprises a vehicle dashboard warning light electrically connected to the pressure-sensing means and arranged so that pressure of less than the predetermined pressure in the pressure chamber causes the warning light to be illuminated.

11. A low fluid level warning system for use with a reservoir to provide a warning when the level of fluid in the reservoir is below a predetermined level, the warning system comprising:

first conduit means having an opening positioned near the bottom inner surface of the reservoir at a first level thereof and below said predetermined level for receiving fluid therefrom;

selectively activated circulating means having activated and deactivated states, and connected to the first conduit means for pumping fluid from the reservoir upwardly through the first conduit means when in the activated state;

pressure chamber means connected to the circulating means to receive pressurized fluid from said circulating means;

pressure-sensing means connected to the pressure chamber means for sensing the pressure therein; and indicator means having activated and deactivated states and connected to the pressure-sensing means for providing an indication of the pressure in the pressure chamber means, the indicator means being in the deactivated state when the pressure in the pressure chamber means is above a predetermined pressure and the indicator means being in the activated state when the pressure in the pressure chamber means is below the predetermined pressure;

said indicator means being deactivated substantially immediately upon selectively activating the circulation means after a period of deactivation of the circulating means when the level of fluid in the reservoir is above the predetermined level;

the improvement which comprises:

the warning system further comprises means in fluid communication with the pressure chamber means and the reservoir to maintain the pressure in the pressure chamber means below said predetermined pressure and to thereby maintain the indicator means in an activated state for a relatively short predetermined time upon selectively activating the circulating means and following deactivation of the circulation means when the level of fluid in the reservoir is above the first level but below the predetermined level;

whereby said indicator means is in said activated state only for said relatively short predetermined time following selective activation of the circulating means subsequent to a period of deactivation of the circulating means when the level of fluid is below the predetermined level and above the first level to give an indication of a low-fluid condition.

12. A low oil level warning system for use with an engine oil reservoir to provide a warning when the level of oil in the reservoir is below a predetermined level, the warning system comprising:

first conduit means having an opening positioned near the bottom inner surface of the reservoir at a first level thereof and below the predetermined level for receiving oil therefrom;

an engine activated circulating means driven by the engine and connected to the first conduit means for pumping oil from the reservoir upwardly through the first conduit means when the engine is operated;

pressure chamber means connected to the circulating means to receive pressurized oil from the circulating means;

pressure-sensing means connected to the pressure chamber for sensing the pressure therein; and indicator means having activated and deactivated states and connected to the pressure-sensing means for providing an indication of the pressure in the pressure chamber means, the indicator means being in the deactivated state when the pressure in the pressure chamber means is above a predetermined pressure and the indicator means being in the activated state when the pressure in the pressure chamber means is below the predetermined pressure;

said indicator means being deactivated in a short first time period upon engine start-up when the level of oil in the reservoir is above the predetermined level;

the improvement which comprises:

the warning system further comprises means for delaying deactivation of the indicator means upon engine start-up for a second time period, longer than the first time period, when the level of oil in the reservoir is above the first level but below the predetermined level;

whereby upon engine start-up, said indicator means is activated for said first time period when the oil in the reservoir is above the predetermined level and is activated for said second time period before deactivation when the oil in the reservoir is below the predetermined level but above the first level, thereby giving an indication of a low oil condition.

* * * * *